Figure 1:
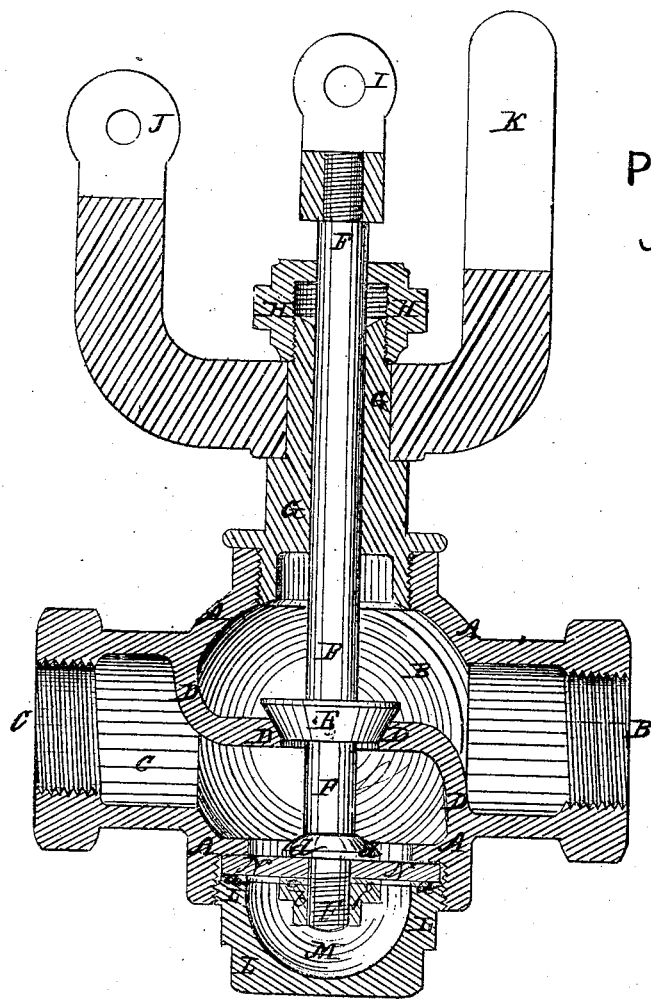

George E. Chenoweth's.
Improvement in Feed-water, Balanced-valves.

73232

PATENTED JAN 14 1868

Witnesses
Jno. D. Patten
Thos. J. Chamberlain

George E. Chenoweth,
By atty. A. B. Stoughton.

United States Patent Office.

GEORGE E. CHENOWETH, OF BALTIMORE, MARYLAND.

Letters Patent No. 73,232, dated January 14, 1868.

---

IMPROVEMENT IN BALANCED FEED-WATER VALVES

---

The Schedule referred to in these Letters Patent and making part of the same.

---

TO ALL WHOM IT MAY CONCERN:

Be it known that I, GEORGE E. CHENOWETH, of the city and county of Baltimore, and State of Maryland, have invented certain new and useful Improvements in Valves for Feed-Water for Steam-Boilers, and other purposes, and which I term a "Feed-Water Balanced Valve;" and I do hereby declare the following to be a full, clear, and exact description of the same, reference being had to the accompanying drawing, which represents a section through the valve, and which makes a part of this specification.

My invention consists in combining with the valve, valve-stem, and passages, an elastic diaphragm, and an air-chamber covered by it, so that the valve will remain in any position that it is placed at, whether open or closed, or become very sensitive to any automatic device for operating it, there being comparatively no weight upon it in any of its positions, or balanced, as I term it.

To enable others skilled in the art to make and use my invention, I will proceed to describe the same with reference to the drawings.

A represents the body of the valve, B the inlet thereto, and C the exit-opening or passage, and D the metallic diaphragm separating or dividing the passages C D, and in which there is an opening controlled by a valve, E, on the valve-stem or rod F, which passes through the usual packing-piece G and nut H. This valve-stem may be worked by a lever pivoted to its head, I, and to an arm, J, said lever moving in a guiding-arm, K, and said lever may be worked by hand, by a float, by steam, or by water, or by a weight, or any other well-known way of opening or closing a valve. At the end of the body of the valve, and in line with the valve-stem F, there is a nut, L, in which there is formed a chamber, M, and this chamber is separated from the passage C by means of an India-rubber or other elastic impermeable diaphragm, N, which is clamped tightly at its perimeter by the nut L, bearing against a ring, $a$, laid against the diaphragm, so that the central portion thereof, to which the valve-stem F is fastened by a nut, $b$, and a plate, $c$, clamping the rubber or other material against the shoulder $d$ on the valve-stem, may move with the valve-stem.

The location of the air-chamber in the nut L admits of easy access to the diaphragm N for repairs by simply unscrewing the nut. The diaphragm N may be made of a thin piece of elastic or spring sheet metal, but I prefer the rubber, as being cheap, durable, and very efficient. Its effect, in conjunction with the air-chamber under it, is to so balance or control the valve as to cause it to move with great sensitiveness, and to remain at any point, open or closed, that it may be moved to.

Having thus fully described my invention, what I claim therein as new, and desire to secure by Letters Patent, is—

In combination with the valve, valve-stem, and passages, an elastic impermeable diaphragm, and air-chamber underneath it, for the purpose of holding the valve in a balanced condition in any of the positions of the valve, substantially as herein described and represented.

GEO. E. CHENOWETH.

Witnesses:
A. B. STOUGHTON,
THOS. W. MORSE.